(12) United States Patent
Matsuo et al.

(10) Patent No.: US 9,151,256 B2
(45) Date of Patent: Oct. 6, 2015

(54) OVERFILL PREVENTION VALVE

(75) Inventors: Shinichi Matsuo, Yokohama (JP); Nobuhiro Hirata, Yokohama (JP); Shinji Shimokawa, Toyota (JP)

(73) Assignees: PIOLAX, INC., Yokohama-Shi, Kanagawa (JP); TOYOTA JIDOSHA KABUSHIKI KAISHA, Toyota-Shi, Aichi (JP)

(*) Notice: Subject to any disclaimer, the term of this patent is extended or adjusted under 35 U.S.C. 154(b) by 0 days.

(21) Appl. No.: 14/004,142

(22) PCT Filed: Feb. 8, 2012

(86) PCT No.: PCT/JP2012/052841
§ 371 (c)(1),
(2), (4) Date: Sep. 9, 2013

(87) PCT Pub. No.: WO2012/124410
PCT Pub. Date: Sep. 20, 2012

(65) Prior Publication Data
US 2013/0340890 A1    Dec. 26, 2013

(30) Foreign Application Priority Data
Mar. 16, 2011   (JP) .................. 2011-058504

(51) Int. Cl.
*F02M 37/00*   (2006.01)
*F02M 37/20*   (2006.01)
(Continued)

(52) U.S. Cl.
CPC ...... *F02M 37/0082* (2013.01); *B60K 15/03519* (2013.01); *F02M 25/0872* (2013.01); *F02M 37/0029* (2013.01); *F02M 37/20* (2013.01); *F16K 17/30* (2013.01); *F16K 24/04* (2013.01)

(58) Field of Classification Search
CPC .......... F02M 37/0082; F02M 37/0029; F02M 37/20; F02M 25/0872; F16K 24/04; F16K 17/30

USPC .......... 141/192, 201, 214, 215, 223, 226, 228
See application file for complete search history.

(56) References Cited

U.S. PATENT DOCUMENTS 2,630,822 A * 3/1953 Davies ........................... 141/21
2,703,195 A * 3/1955 Froidevaux ................... 141/215
(Continued)

FOREIGN PATENT DOCUMENTS

CN    1534184 A    10/2004
CN    101014793 A    8/2007
(Continued)

OTHER PUBLICATIONS

International Search Report (ISR) (PCT Form PCT/ISA/210), in PCT/JP2012/052841, dated Apr. 24, 2012.
(Continued)

*Primary Examiner* — Jason K Niesz
*Assistant Examiner* — Andrew Schmid
(74) *Attorney, Agent, or Firm* — McGinn IP Law Group, PLLC.

(57) ABSTRACT

An overfill prevention valve includes: a valve housing having a first valve seat communicating with a fuel tank, and a second valve seat communicating with a canister; a parent valve disposed slidably within the valve housing, and having a base end opening communicating with a first opening, a front end opening communicating with a second opening and a third valve seat provided in the base end opening; a first urging unit which urges the parent valve toward the first valve seat; a child valve disposed slidably within the parent valve; a second urging unit which urges the child valve toward the third valve seat; and an air passage forming unit which forms an air passage between the parent valve and the first valve seat when the patent valve abuts on the first valve seat.

19 Claims, 8 Drawing Sheets

(51) Int. Cl.
*F02M 25/08* (2006.01)
*F16K 24/04* (2006.01)
*B60K 15/035* (2006.01)
*F16K 17/30* (2006.01)

(56) References Cited

U.S. PATENT DOCUMENTS

| | | | | |
|---|---|---|---|---|
| 2,938,550 | A | * | 5/1960 | Klamm et al. ............... 141/215 |
| 3,144,056 | A | * | 8/1964 | Mosher ........................ 141/192 |
| 3,530,906 | A | * | 9/1970 | Wright et al. ................. 141/59 |
| 3,796,240 | A | * | 3/1974 | Miller, Jr. .................... 141/198 |
| 3,929,155 | A | * | 12/1975 | Garretson ..................... 137/430 |
| 5,392,804 | A | | 2/1995 | Kondo et al. |
| 5,797,434 | A | * | 8/1998 | Benjey et al. ................. 141/59 |
| 5,813,432 | A | * | 9/1998 | Elsdon et al. ................ 137/413 |
| 5,842,500 | A | * | 12/1998 | Rockwood et al. ........... 137/413 |
| 5,848,494 | A | * | 12/1998 | Spelt ............................. 47/67 |
| 6,003,542 | A | * | 12/1999 | Pizzacalla et al. ............ 137/397 |
| 6,085,771 | A | * | 7/2000 | Benjey et al. ............. 137/15.26 |
| 6,138,709 | A | * | 10/2000 | Home ........................... 137/413 |
| 6,257,287 | B1 | * | 7/2001 | Kippe et al. .................. 141/198 |
| 6,595,236 | B2 | * | 7/2003 | Herlihy ......................... 137/414 |
| 7,147,017 | B2 | * | 12/2006 | Leonhardt ..................... 141/198 |
| 8,490,603 | B2 | | 7/2013 | Kuwayama et al. |
| 2004/0003843 | A1 | * | 1/2004 | Sugiyama et al. ............ 137/202 |
| 2006/0236983 | A1 | * | 10/2006 | Douyama et al. ............. 123/514 |
| 2009/0084449 | A1 | * | 4/2009 | Matsuo ......................... 137/409 |
| 2010/0108155 | A1 | * | 5/2010 | Kobayashi et al. ........... 137/202 |
| 2013/0340890 | A1 | * | 12/2013 | Matsuo et al. ................ 141/198 |

FOREIGN PATENT DOCUMENTS

| | | | |
|---|---|---|---|
| JP | 09-053535 | | 2/1997 |
| JP | H09-060744 A | | 3/1997 |
| JP | 09-177628 | | 11/1997 |
| JP | 2003-148265 A | | 5/2003 |
| JP | 2003148265 A | * | 5/2003 ............. F02M 37/00 |
| JP | 2003-240143 A | | 8/2003 |
| JP | 2004-068738 A | | 3/2004 |
| JP | 3742996 B2 | | 2/2006 |
| JP | 3871515 B2 | | 1/2007 |
| JP | 4070229 B2 | | 4/2008 |
| JP | 2008-163829 A | | 7/2008 |
| JP | 4442567 B2 | | 3/2010 |
| JP | 2010-255458 A | | 11/2010 |
| JP | 2011-141018 A | | 7/2011 |
| JP | 2011141018 A | * | 7/2011 |
| JP | 2012-047169 A | | 3/2012 |

OTHER PUBLICATIONS

Japanese Office Action dated Sep. 2, 2014 with an English translation thereof.
Chinese Office Action dated May 26, 2015 with English translation.

* cited by examiner

OVERFILL PREVENTION VALVE

TECHNICAL FIELD

The present invention relates to an overfill prevention valve for suppressing, at the time of refueling a fuel tank, additional refueling after full-tank regulation by a full-tank regulation valve.

BACKGROUND ART

As a full-tank regulation unit for performing full-tank regulation at the time of refueling a fuel tank of an automobile, a vent tube may be used. One end of the vent tube is inserted into the fuel tank so as to be opened therein, and the other end of the vent tube is connected to the vicinity of a fuel filling opening of a fuel filling pipe. During refueling, gas such as fuel vapor, air, etc. in the fuel tank is made to go out from the fuel filling opening through the vent tube. When the opening of the inserted one end of the vent tube is immersed in fuel within the fuel tank, the fuel climbs up the vent tube and the fuel filling pipe. And, when the climbing-up fuel contacts a sensor of a fuel filler gun inserted into the fuel filling opening, refueling is stopped.

An evaporant line for allowing gas to flow from the fuel tank toward a canister is provided, and the evaporant line is provided with a cut valve (roll-over valve) and a check valve. The cut valve drains gas in the fuel tank out to the canister when the internal pressure of the fuel tank increases to exceed a predetermined value, and introduces air into the fuel tank from the canister when the internal pressure of the fuel tank becomes negative.

Patent Literature 1 discloses, as such check valve, a valve which has a valve casing, a positive pressure valve, and a negative pressure valve. The valve casing has an opening portion which communicates with the cut valve and an opening portion which communicates with the canister. The positive pressure valve is disposed inside the valve casing, and an internal space of the positive pressure valve communicates with the cut valve and the canister. The positive pressure valve is urged to close the opening portion of the valve casing which communicates with the cut valve. The negative pressure valve is disposed within the positive pressure valve. The negative pressure valve is urged to close the canister-side opening portion in the positive pressure valve.

As another full-tank regulation unit for performing full-tank regulation at the time of refueling a fuel tank of an automobile, there is also used a full-tank regulation valve which is attached to an outlet for releasing gas in the fuel tank to the canister through an evaporant line. The full-tank regulation valve closes the outlet when the fuel level reaches a predetermined height. When the fuel level reaches the predetermined height at refueling time, since the outlet is closed by the full-tank regulation valve, the internal pressure of the fuel tank rapidly increases, and the fuel climbs up in the fuel filling pipe and contacts the sensor of the fuel filler gun inserted into the fuel filling opening. Thus, refueling is stopped.

CITATION LIST

Patent Literature

Patent Literature 1
JP-H09-060744-A

SUMMARY OF INVENTION

Technical Problem

When the vent tube is used, gas such as fuel vapor, air, etc. in the fuel tank is made to go out from the fuel filling opening through the vent tube at refueling time. Thus, the fuel vapor may flow out to the outside air through the fuel filling opening.

On the other hand, when the full-tank regulation valve is used, gas in the fuel tank passes through the evaporant line from the vent hole to thereby flow out from the canister at refueling time. Thus, fuel vapor does not flow out to the outside air.

The full-tank regulation valve is configured such that, when the float rises due to refueling and closes the outlet, the internal pressure of the fuel tank increases at a stroke, thereby performing full-tank regulation. After a time passes in this situation, gas in the fuel tank flows out from the cut valve, and fuel in the fuel filling pipe falls again so that additional refueling can be performed. Although the fuel rises again in the fuel filling pipe after additional refueling, the fuel falls as time elapses, additional refueling can be repeatedly performed.

However, when such additional refueling is repeatedly performed, the fuel level may exceed the initially set full-tank level of the fuel tank. In this case, the cut valve, etc. disposed in the fuel tank may be submerged in the fuel, and functions thereof may be prevented.

According to the check valve of Patent Literature 1, such additional refueling can be performed while adjusting the internal pressure of the fuel tank. However, the valve is normally closed, and cannot be opened unless the internal pressure of the tank reaches a pressure in a predetermined condition.

Further, there may be a legal obligation to mount a diagnosing system to a fuel tank for diagnosing hole openings, etc. in the evaporant line. In such fuel tank, diagnostic error may occur when the valve on the evaporant line is opened at the diagnosing time. Thus, the check valve of Patent Literature 1 may not support the diagnosing system.

An object of the invention is to provide an overfill prevention valve which can suppress, at refueling time, additional refueling after full-tank regulation by a full-tank regulation valve, such that the valve is opened after additional refueling.

Solution to Problem

To achieve the foregoing object, the invention provides
an overfill prevention valve disposed in an evaporant line of
  a fuel tank device, the fuel tank device having a full-tank
  regulation valve which closes an outlet of fuel vapor
  when a fuel level reaches a predetermined height at
  refueling time, and the evaporant line through which an
  inside of the fuel tank communicates with an outside
  canister, the overfill prevention valve including:
a valve housing having
  a first opening which communicates with the fuel tank,
  a second opening which communicates with the canister,
  a first valve seat provided in the first opening, and
  a second valve seat provided in the second opening;
a parent valve which is disposed slidably within the valve
  housing so as to come close to and go away from the first
  valve seat and the second valve seat, and which has an
  internal space within which the parent valve having:
  a base end opening communicating with the first opening, a front end opening communicating with the second opening, and a third valve seat provided in the base end opening;

a first urging unit which urges the parent valve toward the first valve seat;

a child valve which is disposed slidably within the parent valve so as to come close to and go away from the third valve seat;

a second urging unit which is disposed within the parent valve and which urges the child valve toward the third valve seat; and an air passage forming unit which forms an air passage between the parent valve and the first valve seat when the parent valve abuts on the first valve seat;

wherein an urging force of the first urging unit and an urging force of the second urging unit are set such that, in a state where the parent valve slides against the urging force of the first urging unit and abuts on the second valve seat due to an internal pressure of the fuel tank, a valve opening pressure of the child valve against the third valve seat is higher than a valve re-opening pressure of the parent valve against the second valve seat.

The invention may provide the overfill prevention valve, wherein the valve housing is disposed such that the first opening faces down and the second opening faces up, and wherein the first urging unit is gravitational force applied to the parent valve and the child valve contained therein.

The invention may provide the overfill prevention valve, wherein the first urging unit is a spring, wherein plural ribs are formed on a surface of the parent valve on which the spring abuts, and wherein the ribs define an air passage between the parent valve and the spring.

The invention may provide the overfill prevention valve, wherein a vent hole having a smaller diameter than that of the front end opening is formed in a portion of the parent valve located outwardly of an outer circumferential portion of the front end opening which abuts on the second valve seat.

Advantageous Effects of Invention

According to the invention, when the fuel level reaches a predetermined height at refueling time, the full-tank regulation valve is closed, and the internal pressure of the fuel tank increases at a stroke. As a result, the parent valve abuts on the second valve seat against the urging force of the first urging unit. Further, the child valve goes away from the third valve seat against the urging force of the second urging unit. As a result, gas such as fuel vapor, air, etc. in the fuel tank passes through the first valve seat from the first opening, further passes through the base end opening and the front end opening of the parent valve, and then flows out to the evaporant line. Thus, the internal pressure of the fuel tank can be prevented from increasing, and the fuel can be prevented from overflowing from the fuel filling opening.

On the other hand, when the full-tank regulation valve is closed and the internal pressure of the fuel tank increases at a stroke, the fuel climbs up the fuel filling pipe to thereby contact a fuel filler gun inserted from the fuel filling opening. Thus, refueling is stopped. After refueling is stopped, the internal pressure of the fuel tank decreases, and the child valve abuts on the third valve seat due to the urging force of the second urging unit. As a result, the parent valve abuts on the second valve seat while the child valve abuts on the third valve seat, thereby closing the evaporant line. Since gas can circulate slightly between the contact surfaces of each valve contacting a corresponding valve seat, the pressure decreases gradually. However, the falling speed of the fuel level in the fuel filling pipe is lowered.

When additional refueling is performed here, the fuel climbs up the fuel filling pipe again. When the fuel comes close to the fuel filling opening, the operator stops refueling. When the timing of additional refueling is rapid, the falling speed of the fuel level in the fuel filling pipe is kept low because the state where the parent valve abuts on the second valve seat and the child valve abuts on the third valve seat is kept. As a result, the operator is allowed to recognize that the fuel tank is filled with almost full of fuel reaching a limit of additional refueling, and stops the additional refueling. In this manner, the fuel tank is prevented from being overfilled such that fuel exceeds a limit height to keep the cut valves closed.

In a short time after additional refueling is stopped, the internal pressure of the fuel tank further decreases, and the parent valve abuts on the first valve seat due to the urging force of the first urging unit. Because air passage is formed between the parent valve and the first valve seat, air, fuel vapor, etc. in the fuel tank can pass through the evaporant line more easily. The internal pressure of the fuel tank decreases rapidly, thereby returning to the normal state.

DESCRIPTION OF EMBODIMENTS

An embodiment of an overfill prevention valve according to the invention will be described below with reference to FIGS. 1 to 6.

Figure 5:
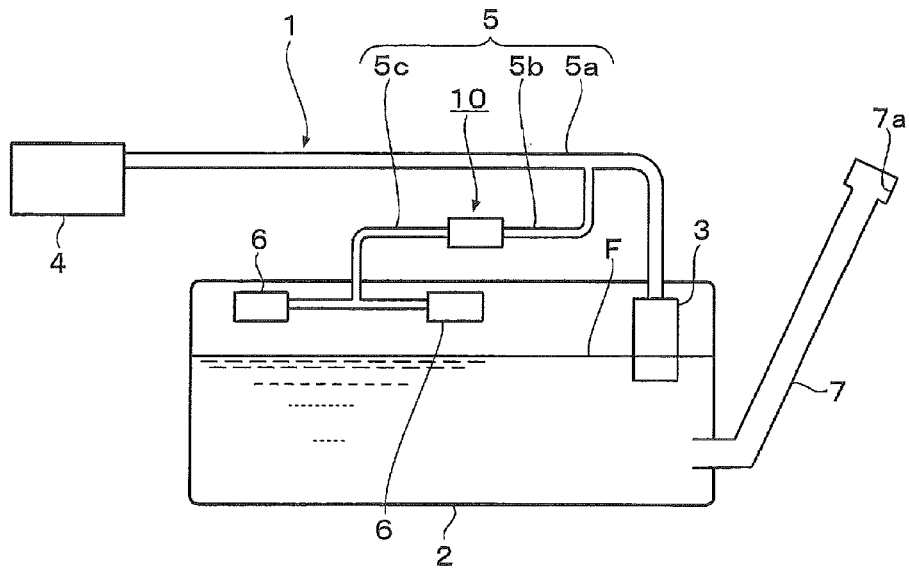
[FIG. 5] A schematic configuration view of a fuel tank to which the overfill prevention valve is applied.

An overfill prevention valve 10 according to the embodiment is disposed in a fuel tank device 1 as shown in FIG. 5. The fuel tank device 1 includes a fuel tank 2, a full-tank regulation valve 3, an evaporant line 5, and plural cut valves 6. The full-tank regulation valve 3 is disposed inside the fuel tank 2. When the fuel level reaches a predetermined height at the time of refueling the fuel tank 2, the full-tank regulation valve 3 closes an outlet of fuel vapor. The evaporant line 5 connects the inside of the fuel tank 2 to a canister 4 disposed outside the fuel tank 2. The cut valves 6 prevent fuel from externally leaking when a vehicle makes a sharp turn to swing the fuel level or the vehicle turns over. The plural cut valves 6 are disposed above the fuel level at which a float of the full-tank regulation valve 3 goes up to close a vent hole, inside the fuel tank 2 (see FIG. 5).

The evaporant line 5 includes a valve connection pipe 5a, a canister-side pipe 5b, and a tank-side pipe 5c. One end of the valve connection pipe 5a is connected to the full-tank regulation valve 3, and the other end thereof is connected to the canister 4. One end of the canister-side pipe 5b is connected to the middle of the valve connection pipe 5a, and the other end thereof is connected to the overfill prevention valve 10. One end of the tank-side pipe 5c is connected to the overfill prevention valve 10, and the other end thereof branches into plural pipes such that end portions of these branch pipes are connected to the plural cut valves 6.

Floats not shown are disposed slidably inside the full-tank regulation valve 3 and the cut valves 6. These floats normally move down due to their own weights, such that the full-tank regulation valve 3 communicates with the canister 4, and such that the plural cut valves 6 communicate with the canister 4, thereby discharging gas such as fuel vapor, air, etc. in the fuel tank 2 to the canister 4 outside the fuel tank 2 through the evaporant line 5.

On the other hand, when fuel is fed from a fuel filling pipe 7, as the fuel level of the fuel tank 2 rises, the float contained in the full-tank regulation valve 3 rises to close the outlet, thereby stopping discharge of gas from the fuel tank 2. Since the cut valves 6 are provided above the full-tank regulation valve 3, the floats contained in the cut valves 6 do not rise even when the fuel level rises to the height at about which the float of the full-tank regulation valve 3 rises. Even when the outlet of the full-tank regulation valve 3 is closed, gas in the fuel tank 2 is discharged to the canister 4 through the tank-side pipe 5c, the overfill prevention valve 10 and the canister-side pipe 5b.

Figure 1:
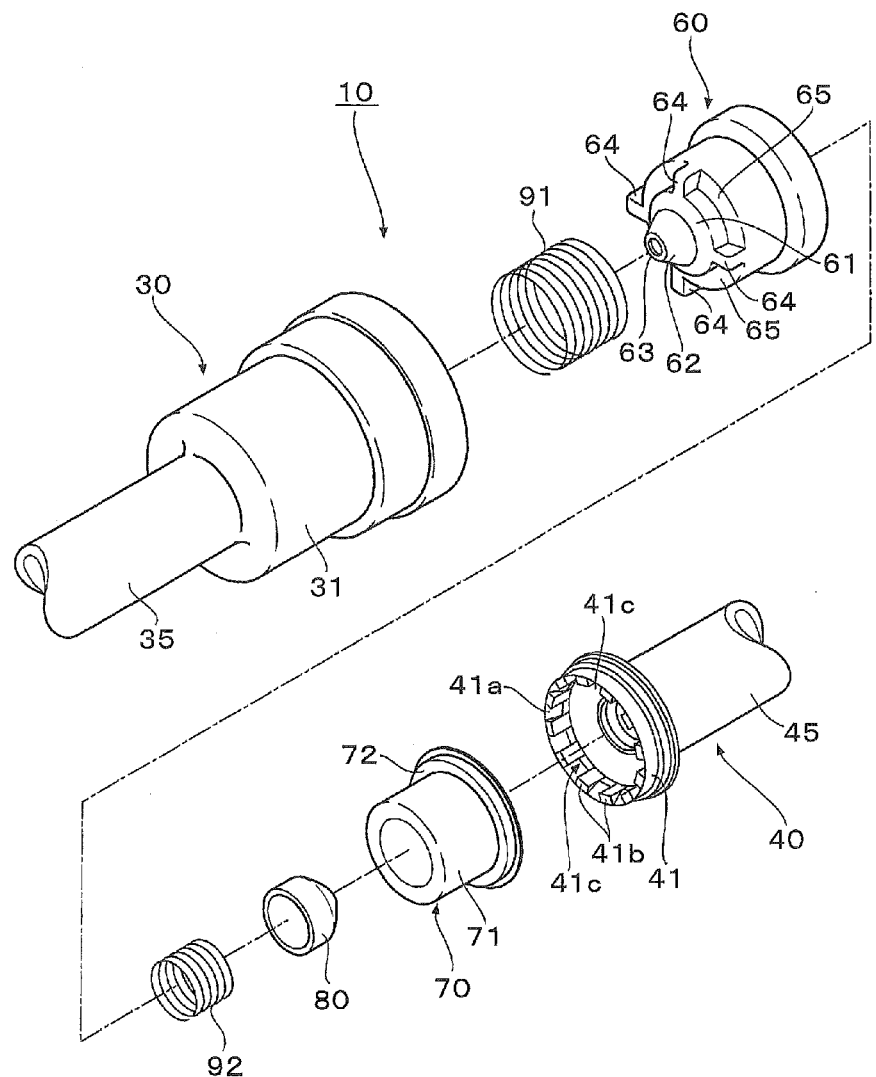
[FIG. 1] An exploded perspective view showing an embodiment of an overfill prevention valve according to the invention.
Figure 2:
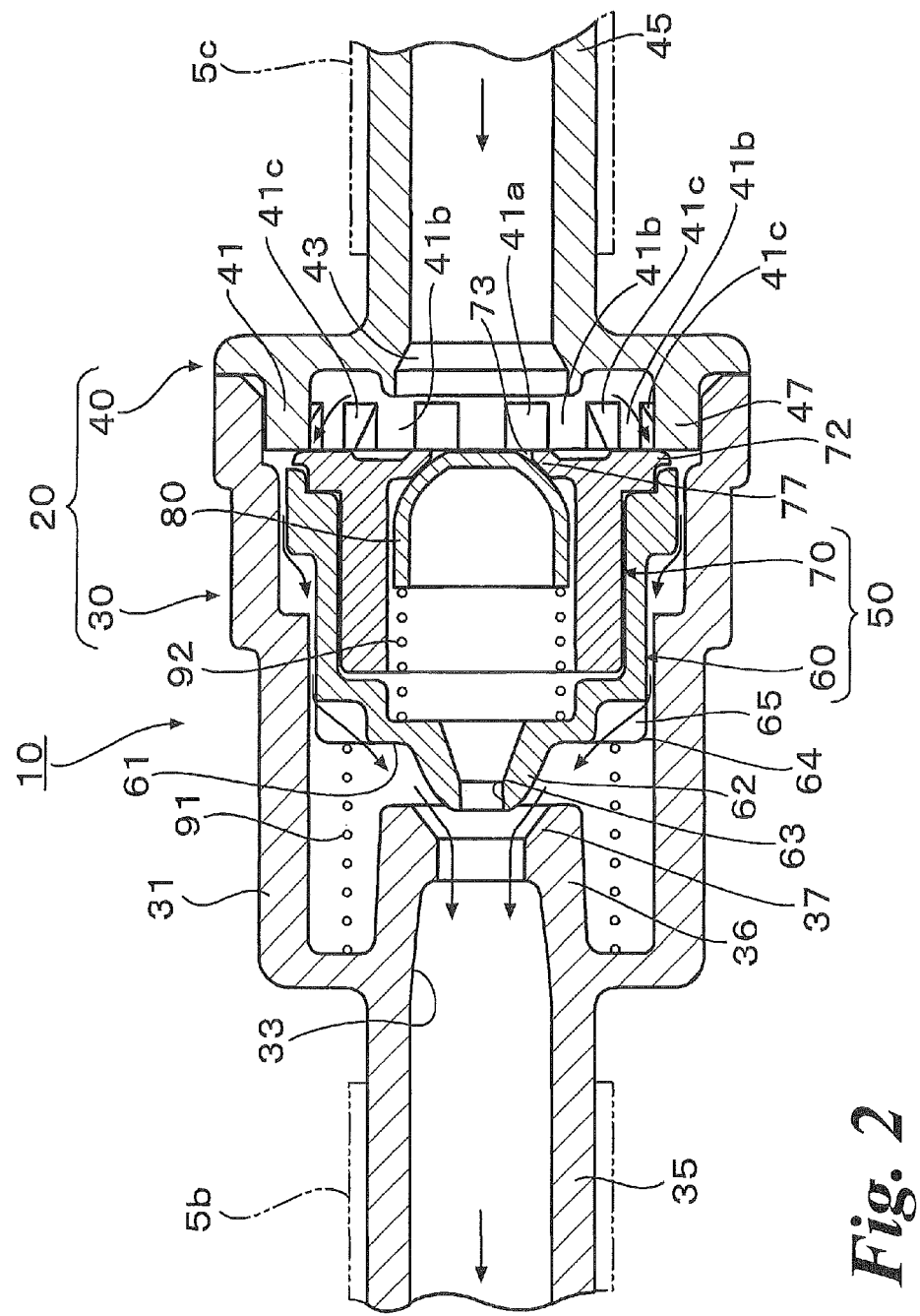
[FIG. 2] A sectional view showing a state in which a parent valve abuts on a first valve seat of the overfill prevention valve while a child valve abuts on a third valve seat.

As shown in FIG. 1 and FIG. 2, the overfill prevention valve 10 in the embodiment has a valve housing 20, a parent valve 50, a child valve 80, a first spring 91, and a second spring 92. A first valve seat 47 and a second valve seat 37 are formed in the valve housing 20, and a third valve seat 77 is formed in the parent valve 50. The parent valve 50 is disposed slidably in the valve housing 20. The child valve 80 is disposed slidably in the parent valve 50. The first spring 91 urges the parent valve 50 toward the first valve seat 47. The second spring 92 urges the child valve 80 toward the third valve seat 77. In the embodiment, the first spring 91 forms the "first urging unit" in the invention and the second spring 92 forms the "second urging unit" in the invention.

The valve housing 20 includes a main housing 30 connected to the canister-side pipe 5b, and a sub housing 40 assembled with the main housing 30 and connected to the tank-side pipe 5c.

The main housing 30 has a bottomed tubular cylinder 31, a second opening 33 formed in the center of the bottom portion of the cylinder 31 to communicate with the canister, and a connection pipe 35 provided to extend from an outer rim of the second opening 33 and connected to the canister-side pipe 5b. A spring supporting cylinder 36 supporting the first spring 91 protrude a predetermined length from an inner rim of the second opening 33. A front end portion of the spring supporting cylinder 36 forms the second valve seat 37, such that the front end of the parent valve 50 comes close to or goes away from the second valve seat 37. The inner circumference of the second valve seat 37 is tapered such that a diameter reduces toward the second opening 33.

The sub housing 40 has a lid portion 41 fitted into an opening portion of the cylinder 31 of the main housing 30, a first opening 43 formed in the center of the bottom of the lid portion 41, and a connection pipe 45 provided to extend from an outer rim of the first opening 43 and connected to the tank-side pipe 5c. A front end portion of the lid portion 41 forms the first valve seat 47, such that a base end of the parent valve 50 comes close to or goes away from the first valve seat 47. An inner circumferential surface 41a of the lid portion 41 is tapered such that a diameter expands gradually from the bottom of the lid portion 41 toward an opening portion of the front end. Plural ribs 41b protrude from the inner circumferential surface 41a at regular intervals. The ribs 41b allow circulation of gas through air passages 41c between the ribs 41b and 41b even when the base end portion of the parent valve 50 abuts on the first valve seat 47 as shown in FIG. 2. That is, in the embodiment, the ribs 41b form the "air passage forming unit" in the invention.

The parent valve 50 is disposed slidably within the valve housing 20 so as to come close to or go away from the first valve seat 47 and the second valve seat 37. The parent valve 50 has a valve body 60 which has a front end opening 63 communicating with the second opening 33, and a valve cap 70 which is fitted into the valve body 60 and has a base end opening 73 communicating with the first opening 43.

The valve body 60 is substantially shaped like a cylinder. A base end of the valve body 60 is opened, and a stepwise portion 61 of a reduced diameter is formed at a front side of the valve body 60. A curved valve head portion 62 protrudes from the stepwise portion 61. The valve head portion 60 can come close to and go away from the second valve seat 37, such that a small gap is formed between the second valve seat 37 and the valve head portion 62 even when the valve head portion 62 abuts on the second valve seat 37. This gap allows circulation of gas from the internal space of the valve housing 20 toward the second opening 33. A front end opening 63 is formed in the center of a front end of the valve head portion 62 so as to communicate with the second opening 33. Plural ribs 64 radially protrude from an outer circumference of the stepwise portion 61 at regular intervals, and support one end of the first spring 91, as shown in FIG. 2. Gaps between these ribs 64 and 64 form air passages 65 between the parent valve 50 and the first spring 91, and allow circulation of gas through the air passages 65.

The valve cap 70 has a cylindrical insertion portion 71 inserted into the inner circumference of the valve body 60, and a lid portion 72 provided consecutively to one end of the insertion portion 71 and fitted into the base end opening of the valve body 60. A base end opening 73 is formed in the center of the lid portion 72. An inner circumference of the base end opening 73 is formed into a curved shape. A third valve seat 77 is provided in the inner circumference of the base end opening 73, such that the child valve 80 can come close to and go away from the third valve seat 77.

As described above, the first spring 91 is fitted onto the outside of the spring supporting cylinder 36 of the main housing 30. One end of the first spring 91 abuts on the ribs 64 of the valve body 60 so as to be supported thereon while the other end of the first spring 91 abuts on an end surface of the cylinder 31 so as to be supported thereon. In this manner, the first spring 91 is held in a compressed state between the parent valve 50 and the main housing 30. The first spring 91 urges the base end of the parent valve 50 toward the first valve seat 47 so that the lid portion 72 of the valve cap 70 normally abuts on the first valve seat 47 (see FIG. 2). The air passages 41c allow circulation of gas between the first valve seat 47 and the parent valve 50 even in this state. When the internal pressure of the fuel tank 2 becomes higher than the urging force of the first spring 91, the parent valve 50 slides against the urging force of the first spring 91 so as to go away from the first valve seat 47. When the internal pressure of the fuel tank 2 becomes further higher, the valve head portion 62 of the parent valve 50 abuts on the second valve seat 37 (see FIGS. 3 and 4).

The parent valve 50 has the valve body 60 and the valve cap 70, and the child valve 80 is disposed slidably within the parent valve 50. The child valve 80 is shaped like a cylinder. A front end of the child valve 80 has a rounded and curved shape, and a base end of the child valve 80 is opened. As shown in FIG. 2, the child valve 80 is contained in the valve cap 70, such that the curved-shape front end faces the third valve seat 77. One end of the second spring 92 is supported on the inner surface of the front end portion of the valve body 60, and the other end of the second spring 92 abuts on the base end of the child valve 80. The front end of the child valve 80 is urged toward the third valve seat 77, so that the outer circumference of the front end of the child valve 80 normally abuts on the third valve seat 77 to close the base end opening 73 of the parent valve 50. When the internal pressure of the fuel tank 2 becomes higher than the urging force of the second spring 92 while the parent valve 50 abuts on the second valve seat 37, the child valve 80 slides against the urging force of the second spring 92 so as to go away from the third valve seat 47 to thereby open the base end opening 73 of the parent valve 50.

In the overfill prevention valve 10, the urging forces of the first spring 91 and the urging force of the second spring 92 are set such that, in the state where the parent valve 50 slides against the urging force of the first spring 91 and abuts on the second valve seat 37 due to the internal pressure of the fuel tank 2, the valve opening pressure (the pressure in the case where the child valve 80 goes away from the third valve seat 77) of the child valve 80 against the third valve seat 77 is higher than the valve re-opening pressure (the pressure in the case where the parent valve 50 goes away from the second valve seat 37) of the parent valve 50 against the second valve seat 77.

In the overfill prevention valve 10, assuming that the state in which the parent valve 50 abuts on the first valve 47 is A (see FIG. 2), that the state in which the parent valve 50 abuts on the second valve seat 37 and the child valve 80 abuts on the third valve seat 77 is B (see FIG. 4), and that the state in which the parent valve 50 abuts on the second valve seat 37 against the urging force of the first urging unit (first spring 91) and the child valve 80 goes away from the third valve seat 77 against the urging force of the second urging unit (second spring 92) is C (see FIG. 3), the relation C<B is given as to ventilation loss (that is, gas can circulate more easily in C than in B).

Figure 6:
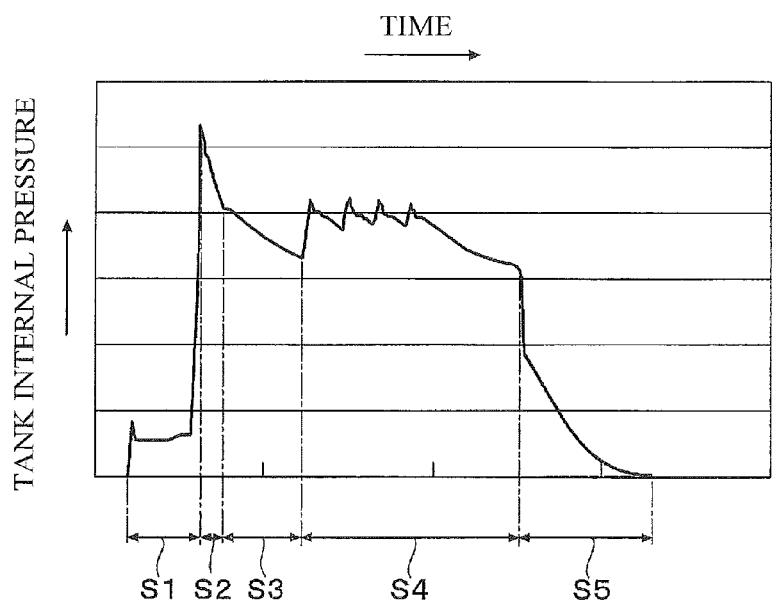
[FIG. 6] A graph showing the internal pressure change of the fuel tank using the overfill prevention valve according to the invention at the time of refueling the fuel tank.

Next, the function and effect of the above-described overfill prevention valve 10 will be described with reference to a graph of FIG. 6 which indicates the relation between the internal pressure of the fuel tank 2 at refueling time and thereafter.

As shown in FIG. 5, the overfill prevention valve 10 in the embodiment is disposed in the evaporant line 5 of the fuel tank device 1 such that the tank-side pipe 5c is connected to the connection pipe 45 of the sub housing 40 while the canister-side pipe 5b is connected to the connection pipe 35 of the main housing 30.

As shown in FIG. 2, in the overfill prevention valve 10, when the float of the full-tank regulation valve 3 does not rise and the vent hole is not closed, since the first spring 91 urges the parent valve 50 toward the first valve seat 47 such that the lid portion 72 of the valve cap 70 abuts on the first valve seat 47 while the second spring 92 urges the child valve 80 toward the third valve seat 77 such that the outer circumference of the front end of the child valve 80 abuts on the third valve seat 77, the base end opening 73 of the parent valve 50 is closed (state A).

When fuel is fed into the fuel tank 2 through the fuel filling pipe 7 from a fuel filler gun not shown inserted into a fuel filling opening 7a of the fuel filling pipe 7 of the fuel tank device 1, the fuel level F in the fuel tank 2 rises gradually. Then, gas such as fuel vapor, air, etc. in the fuel tank 2 is discharged to the canister 4 via the full-tank regulation valve 3 and the valve connection pipe 5a.

In this state, because the floats contained in the cut valves 6 also move down, the gas in the fuel tank 2 passes through the cut valves 6 and the tank-side pipe 5c, and then, in the overfill prevention valve 10, passes through the first opening 43, the air passages 41c between the ribs 41b and 41b, the gap between the valve housing 20 and the parent valve 50, the air passages 65 between the ribs 64 and 64 of the parent valve 50, the second valve seat 37 and the second opening 33, as represented by the arrows in FIG. 2. The gas further passes through the canister-side pipe 5b and the valve connection pipe 5a, and is discharged to the canister 4.

In this embodiment, when the parent valve 50 abuts on the first valve seat 47, the gas flowing into the valve housing 20 through the air passages 41c between the parent valve 50 and the first valve seat 47 flows out toward the second valve seat 37 and the second opening 33 through the air passages 65 between the ribs 64 and 64 which consist a surface abutted by the first spring 91. Thus, the gas can flow out toward the second opening 33 without passing through the first spring 91 from its outer circumference to its inner circumference. As a result, ventilation resistance can be reduced.

When the fuel level F rises and the float of the full-tank regulation valve 3 is immersed and risen to close the outlet, the gas cannot be discharged from the outlet of the full-tank regulation valve 3. Although the gas in the fuel tank 2 can be discharged from the cut values 6 to the canister 4 via the tank-side pipe 5c, the overfill prevention valve 10, the canister-side pipe 5b and the valve connection pipe 5a even in this state, since the inner diameters of the tank-side pipe 5c and the canister-side pipe 5b are small. Thus, due to ventilation resistance of the overfill prevention valve 10, etc., the flow rate cannot be kept high. As a result, as the fuel vigorously flows in, the internal pressure of the fuel tank 2 increases at a stroke, and the fuel flows back through the fuel filling pipe 7 and climbs up toward the fuel filling opening 7a, so that a sensor of a fuel filling nozzle detects the fuel and stops refueling, thereby performing full-tank regulation.

Figure 3:
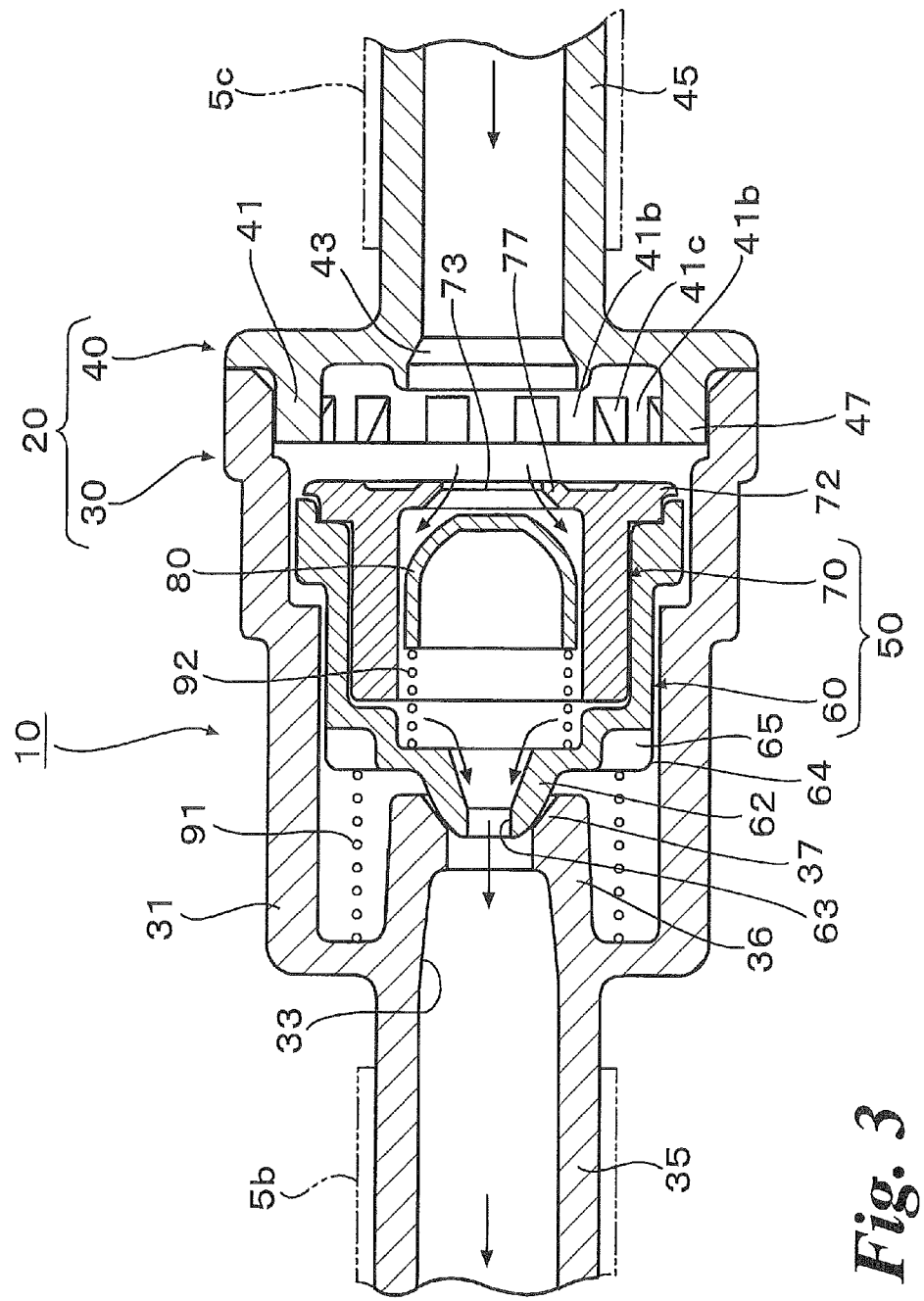
[FIG. 3] A sectional view showing a state in which the parent valve abuts on a second valve seat of the overfill prevention valve while the child valve goes away from the third valve seat.

In accordance with the operation of the full-tank regulation valve 3, the overfill prevention valve 10 according to the invention performs overfill prevention as follows. That is, when the float of the full-tank regulation valve 3 rises to close the vent hole and the internal pressure of the fuel tank 2 increases at a stroke, the parent valve 50 is pressed in the state of FIG. 2 (state A) and slides against the urging force of the first spring 91 such that the valve head portion 62 at the front end of the parent valve 50 abuts on the second valve seat 37. Then, after it is temporality brought into the state shown in FIG. 4 (the state where the parent valve 50 goes away from the first valve seat 47 while the child valve 80 abuts on the third valve seat 77), it is immediately shifted into the state as shown in FIG. 3 (state C), as the child valve 80 is also pressed and slides against the urging force of the second spring 92 so as to go away from the third valve seat 77. On this occasion, as represented by the sign S1 in FIG. 6, the internal pressure of the fuel tank 2 increases at a stroke.

Then, as represented by the arrows in FIG. 3, gas such as fuel vapor, air, etc. in the fuel tank 2 flows into the internal space of the parent valve 50 through the first opening 43, the first valve seat 47 and the base end opening 73 of the parent valve 50, and further flows into the canister-side pipe 5b through the front end opening 63 and the second opening 33, thereby discharging the gas to the canister 4 through the valve connection pipe 5a. As a result, the internal pressure of the fuel tank 2 can be prevented from further increasing, and the fuel can be prevented from overflowing from the fuel filling opening 7a. On this occasion, as represented by the sign S2 in FIG. 6, the internal pressure of the fuel tank 2 decreases rapidly. As a result of reduction in the internal pressure of the fuel tank 2, the fuel level moved up in the fuel filling pipe 7 starts moving down gradually.

Figure 4:
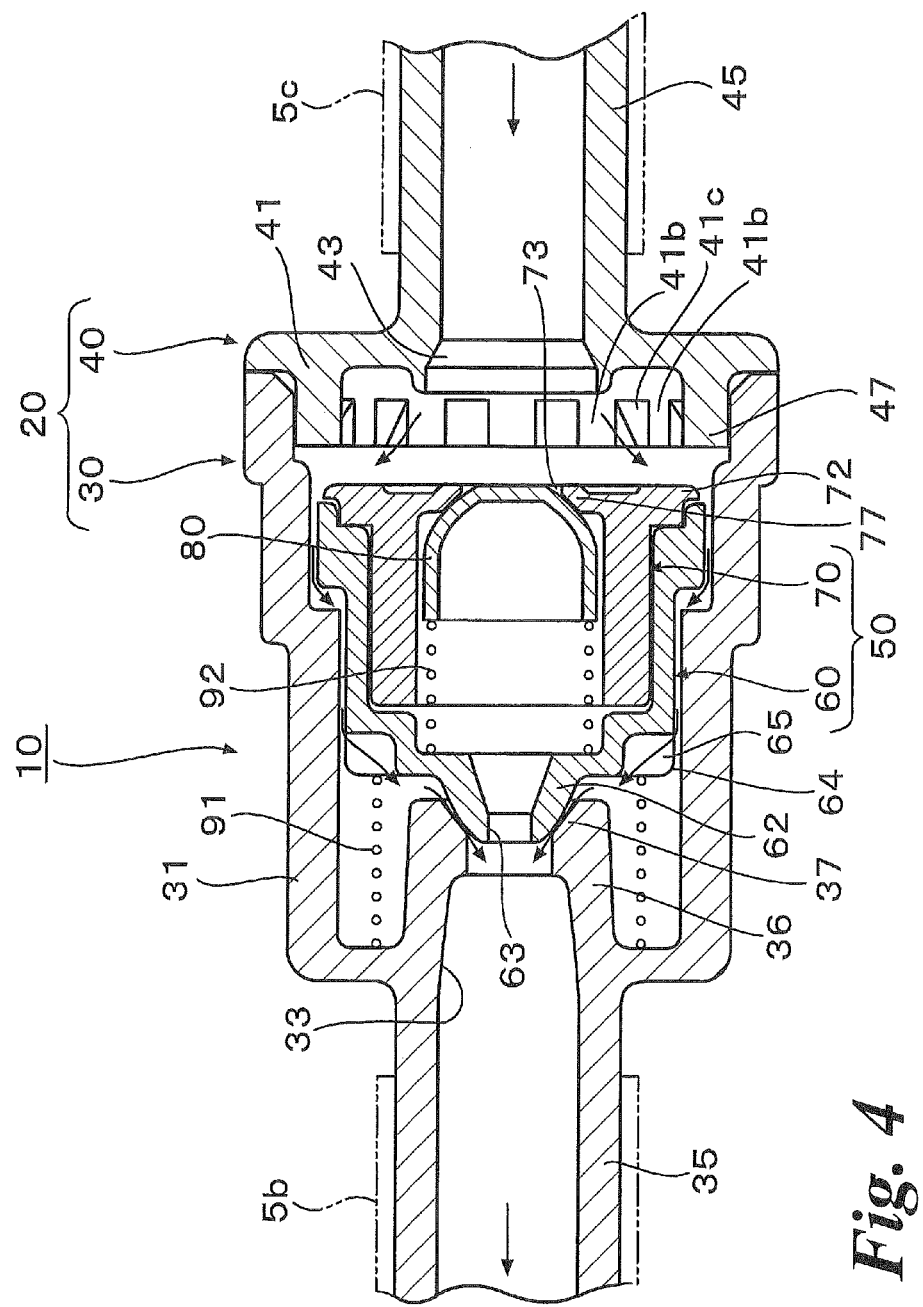
[FIG. 4] A sectional view showing a state in which the parent valve abuts on the second valve seat of the overfill prevention valve while the child valve abuts on the third valve seat.

On the other hand, the urging forces of the first spring 91 and the urging force of the second spring 92 are set such that the valve opening pressure of the child valve 80 against the third valve seat 77 is higher than the valve re-opening pressure of the parent valve 50 against the second valve seat 37. Thus, when the internal pressure of the fuel tank 2 decreases and the urging force of the second spring 92 overcomes the internal pressure of the fuel tank 2, the child valve 80 abuts on the third valve seat 77 in accordance with the urging force of the second spring 92 while the parent valve 50 maintains abutting on the second valve seat 37, as shown in FIG. 4 (state B). That is, the valve head portion 62 of the parent valve 50 abuts on the second valve seat 37 to close the second opening 33 and the child valve 80 abuts on the third valve seat 77 to close the base end opening 73 of the parent valve 50, such that the evaporant line 5 is closed by the parent valve 50 and the child valve 80. Even in this case, because the gas passes through the slight gap between the valve head portion 62 and the second valve seat 37 and flows into the canister-side pipe 5b through the second opening 33 as represented by the arrows in FIG. 4, the gas is discharged to the canister 4 through the valve connection pipe 5a, and the internal pressure of the fuel tank 2 decreases gradually. On this occasion, as represented by the sign S3 in FIG. 6, the internal pressure of the fuel tank 2 decreases more gently than the aforementioned S2. As a result, the falling speed of the fuel level in the fuel filling pipe 7 becomes lower than the falling speed in the state shown in FIG. 3 (state C).

When additional refueling is performed in the aforementioned state, the fuel rises again in the fuel filling pipe 7. When the fuel comes close to the fuel filling opening 7a, the operator stops refueling. When the timing of additional refueling is rapid, the falling speed of the fuel level in the fuel filling pipe 7 is kept low, because the state shown in FIG. 4 (state B) in which the parent valve 50 abuts on the second valve seat 37 and the child valve 80 abuts on the third valve seat 77 is kept. The falling speed of the fuel level in the fuel filling pipe 7 is confirmed by eye observation of the fuel level in the fuel filling pipe 7 through the fuel filling opening 7a. Because the refueling operator is allowed to recognize that the fuel tank 2 refueled with almost full of fuel reaches a limit of additional refueling as a result of the falling speed of the fuel level in the fuel filling pipe 7 being kept low, additional refueling can be stopped. In this manner, the fuel tank is prevented from being overfilled such that fuel exceeds a limit height to submerge the floats of the cut valves 6 to keep the evaporant line 5 closed. The internal pressure change of the fuel tank 2 on this occasion is represented by the sign S4 in FIG. 6.

In a short time after additional refueling is stopped, the internal pressure of the fuel tank 2 further decreases. Thus, the urging force of the first spring 91 overcomes the internal pressure of the fuel tank 2 and the lid portion 72 of the parent valve 50 urged by the first spring 91 abuts on the first valve seat 47, thereby returning to the state A of FIG. 2 again. On this occasion, because the air passages 41c are formed between the ribs 41b and 41b, the gas in the fuel tank 2 can circulate between the parent valve 50 and the first valve seat 47 more easily than that in the state of FIG. 4 (state B). Therefore, after passing through the air passages 41c, the gas passes through the gap between the valve housing 20 and the parent valve 50, the air passages 65 between the ribs 64 and 64 of the parent valve 50 and the second opening 33 respectively, and is further discharged to the canister 4 through the canister-side pipe 5b and the valve connection pipe 5a as represented by the arrows in FIG. 2, so that the internal pressure of the fuel tank 2 decreases rapidly, thereby returning to the normal state. The internal pressure change of the fuel tank 2 on this occasion is represented by the sign S5 in FIG. 6.

In this manner, the falling speed of the fuel level at additional refueling time is reduced by the overfill prevention valve 10 according to the invention to allow the operator to recognize that additional refueling is not required, thereby avoiding the overfilling.

Figure 7:
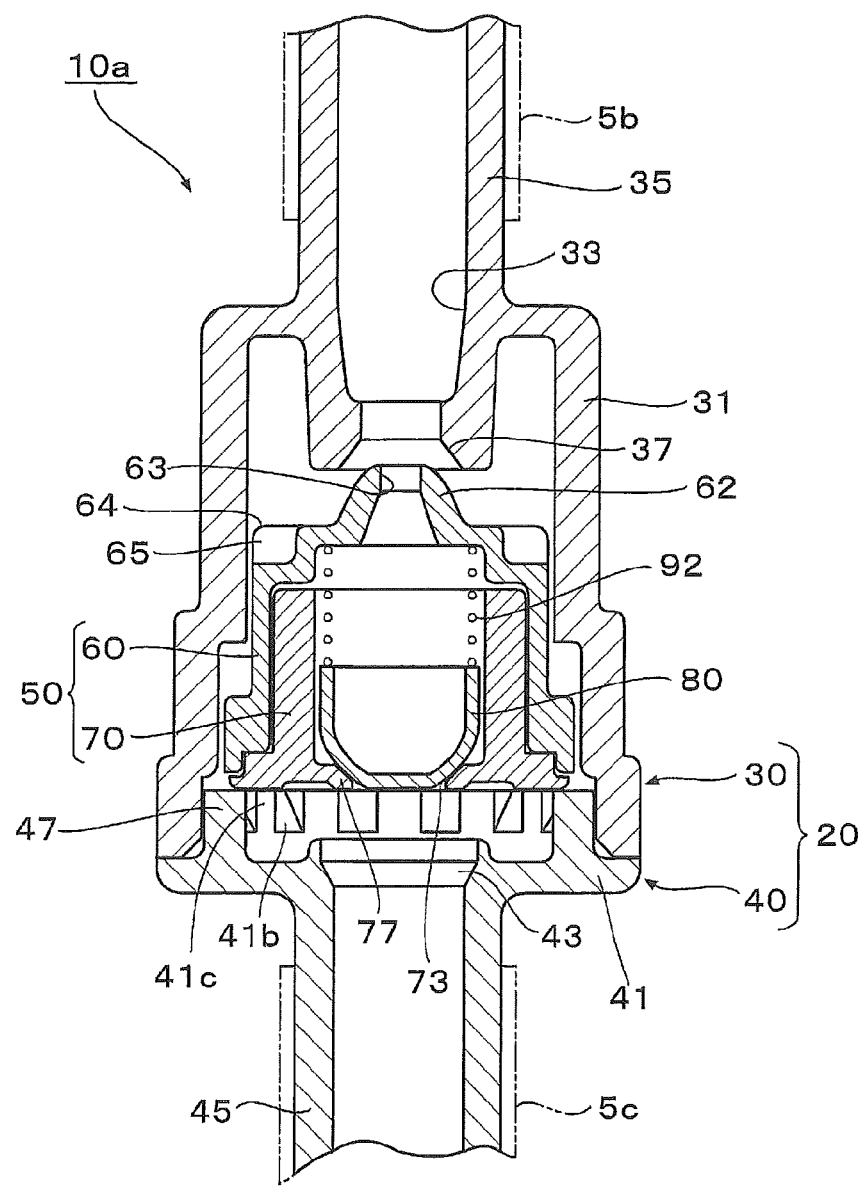
[FIG. 7] A sectional view showing another embodiment of the overfill prevention valve according to the invention, in a state in which the parent valve abuts on the first valve seat while the child valve abuts on the third valve seat.
Figure 8:
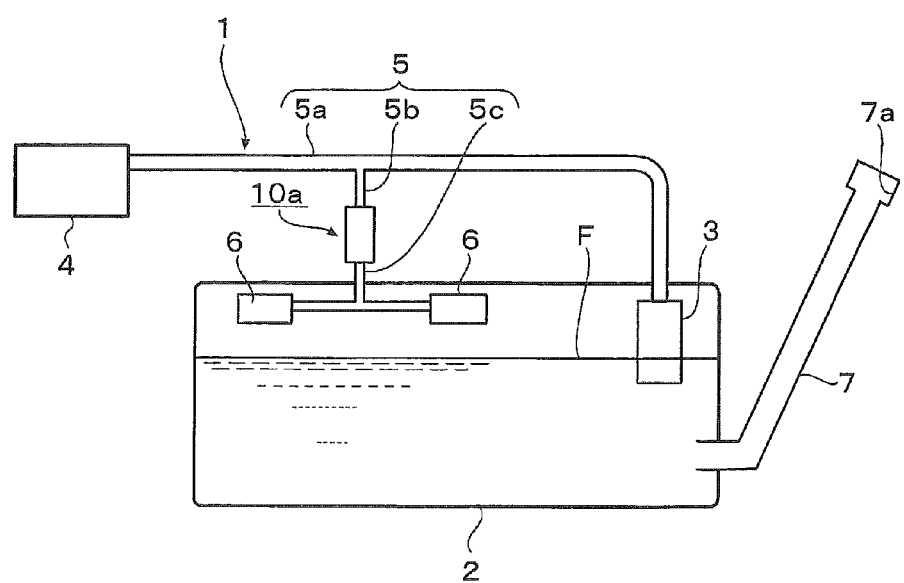
[FIG. 8] A schematic configuration view of the fuel tank to which the overfill prevention valve is applied.

FIGS. 7 and 8 show another embodiment of the overfill prevention valve 10 according to the invention. Parts substantially the same as those in the aforementioned embodiment are referred to by the same signs and description thereof will be omitted.

The overfill prevention valve 10a according to this embodiment is disposed vertically between the tank-side pipe 5c and the canister-side pipe 5b, such that the first opening 43 faces down and the second opening 33 faces up. The first spring 91 in the aforementioned embodiment is not provided. The parent valve 50 is urged toward the first valve seat 47 by the gravitational force applied to the parent valve 50, the child valve 80 contained in the parent valve 50 and the second spring 92. That is, the parent valve 50 normally abuts on the first valve seat 47 due to the aforementioned gravitational force. When the internal pressure of the fuel tank exceeds a predetermined value, the parent valve 50 moves up against the gravitational force and abuts on the second valve seat 37. The urging force of the second spring 92 urging the child valve 80 is set so as to be higher than the valve re-opening pressure at which the parent valve 50 abutting on the second valve seat 37 moves down apart from the second valve seat 37 due to the gravitational force.

The function and effect of the overfill prevention valve 10a are the same as those in the aforementioned embodiment except that the gravitational force is used in place of the urging force of the first spring 91. Thus, description thereof will be omitted. According to the overfill prevention valve 10a, the first spring 91 can be omitted, thereby simplifying assembling work and reducing the production cost.

Figure 9:
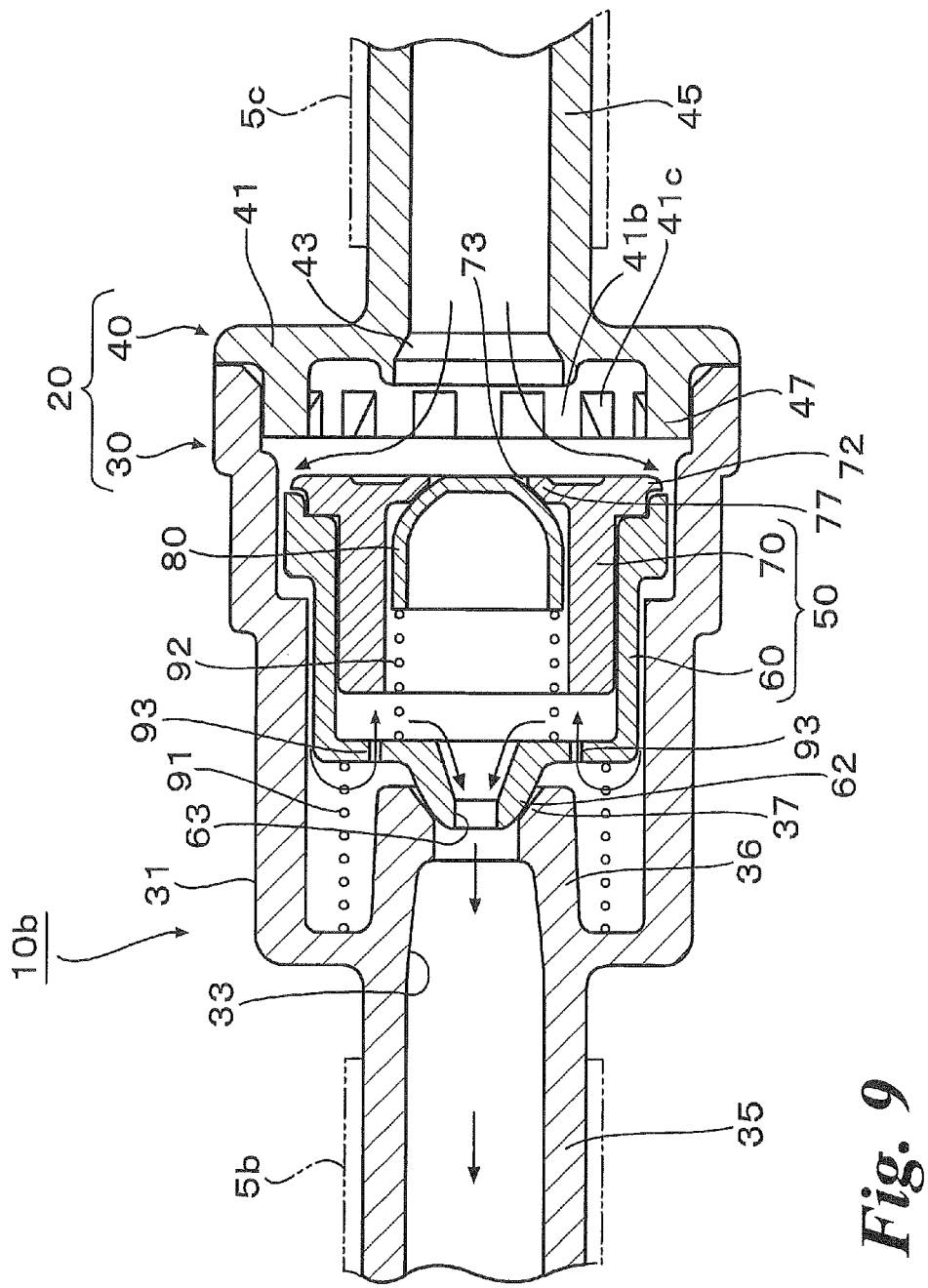
[FIG. 9] A sectional view showing a further embodiment of the overfill prevention valve according to the invention, in a state in which the parent valve abuts on the second valve seat while the child valve abuts on the third valve seat.

FIG. 9 shows a further embodiment of the overfill prevention valve 10 according to the invention. Parts substantially the same as those in the aforementioned embodiment are referred to by the same signs and description thereof will be omitted.

In the overfill prevention valve 10b according to this embodiment, plural vent holes 93 each with a relatively small diameter are provided in the brim of the valve head portion 62 of the valve body 60 of the parent valve 50.

FIG. 9 shows a state where the parent valve 50 abuts on the second valve seat 37 and the child valve 80 abuts on the third valve seat 77 (corresponding to the state B shown in FIG. 4).

In this case, in the overfill prevention valve 10*b*, as represented by the arrows in FIG. 9, gas flowing into the valve housing 20 from the inside of the fuel tank 2 via the first opening 43 and the first valve seat 47 flows into the parent valve 50 through the vent holes 93 formed in the brim of the valve head portion 62 of the parent valve 50, and further flows into the canister-side pipe 5*b* through the front end opening 63 and the second opening 33, thereby discharging the gas to the canister 4 through the valve connection pipe 5*a*. Thus, the internal pressure of the fuel tank 2 decreases gradually.

Because the diameter of each vent hole 93 is so small that the pressure of the fuel tank decreases gradually, the falling speed of the fuel level at additional refueling time becomes slow, thereby allowing the operator to recognize that additional refueling is not required.

The falling speed of the fuel level can be adjusted in accordance with the diameter of each vent hole 93. Because other functions and effects are the same as those in the aforementioned embodiment, description thereof will be omitted.

REFERENCE SIGNS LIST

1 fuel tank device
2 fuel tank
3 full-tank regulation valve
4 canister
5 evaporant line
5*a* valve connection pipe
5*b* canister-side pipe
5*c* tank-side pipe
6 cut valve
7 fuel filling pipe
7*a* fuel filling opening
10, 10*a*, 10*b* overfill prevention valve
20 valve housing
30 main housing
31 cylinder
33 second opening
35 connection pipe
36 spring supporting cylinder
37 second valve seat
40 sub housing
41 lid portion
41*a* inner circumferential surface
41*b* rib
41*c* air passage
43 first opening
45 connection pipe
47 first valve seat
50 parent valve
60 valve body
61 stepwise portion
62 valve head portion
63 front end opening
64 rib
65 air passage
70 valve cap
71 insertion portion
72 lid portion
73 base end opening
77 third valve seat
80 child valve
91 first spring
92 second spring
93 vent hole
F fuel level

What is claimed is:

1. An overfill prevention valve disposed in an evaporant line of a fuel tank device, the fuel tank device comprising a full-tank regulation valve which closes an outlet of fuel vapor when a fuel level reaches a predetermined height at a refueling time, and the evaporant line through which an inside of a fuel tank communicates with an outside canister, the overfill prevention valve including:
 a valve housing comprising:
  a first opening which communicates with the fuel tank;
  a second opening which communicates with the outside canister;
  a first valve seat provided in the first opening; and
  a second valve seat provided in the second opening;
 a parent valve which is disposed slidably within the valve housing so as to come close to and go away from the first valve seat and the second valve seat, and which includes an internal space within which the parent valve is disposed, the parent valve including:
  a base end opening communicating with the first opening;
  a front end opening communicating with the second opening; and
  a third valve seat provided in the base end opening;
 a first urging unit which urges the parent valve toward the first valve seat;
 a child valve which is disposed slidably within the parent valve so as to come close to and go away from the third valve seat;
 a second urging unit which is disposed within the parent valve and which urges the child valve toward the third valve seat; and
 an air passage forming unit which forms an air passage between the parent valve and the first valve seat when the parent valve abuts on the first valve seat,
 wherein an urging force of the first urging unit and an urging force of the second urging unit are set such that:
 in a first state where an internal pressure of the fuel tank is lower than a first predetermined value, the parent valve abuts on the first valve seat due to the urging force of the first urging unit, and the child valve abuts on the third valve seat due to the urging force of the second urging unit;
 in a second state where the internal pressure of the fuel tank exceeds a second predetermined value which is higher than the first predetermined value, the parent valve slides against the urging force of the first urging unit and abuts on the second valve seat, and the child valve goes away from the third valve seat against the urging force of the second urging unit; and
 in a third state where the internal pressure of the fuel tank becomes lower than the second predetermined value but is still higher than the first predetermined value, a valve opening pressure of the child valve from the third valve seat is higher than a valve opening pressure of the parent valve from the second valve seat, so that the child valve abuts on the third valve seat due to the urging force of the second urging unit during when the parent valve is abutting on the second valve seat.

2. The overfill prevention valve of claim 1, wherein the first opening of the valve housing and the second opening of the valve housing are in line with each other, and
 wherein the overfill prevention valve is disposed in the evaporant line of the fuel tank device such that the first opening is positioned downward whereas the second opening is positioned upward, thereby allowing a gravitational force applied to the parent valve and the child valve contained therein function as the first urging unit.

3. The overfill prevention valve of claim 1, wherein the first urging unit comprises a spring, wherein plural ribs are formed on a surface of the parent valve on which the spring abuts, and wherein the ribs define an air passage between the parent valve and the spring.

4. The overfill prevention valve of claim 1, wherein a vent hole having a smaller diameter than that of the front end opening is formed in a portion of the parent valve located outwardly of an outer circumferential portion of the front end opening which abuts on the second valve seat.

5. The overfill prevention valve of claim 1, wherein the parent valve comprises:
   a front end that moves slidably toward the second valve seat; and
   a base end that moves slidably toward the first valve seat.

6. The overfill prevention valve of claim 1, wherein the parent valve includes:
   a valve body that comprises the front end opening communicating with the second opening; and
   a valve cap which is fitted into the valve body and comprises the base end opening communicating with the first opening.

7. The overfill prevention valve of claim 6, wherein a base end of the valve body is opened, and a stepwise portion of a reduced diameter is formed at a front side of the valve body.

8. The overfill prevention valve of claim 7, wherein a curved valve head portion protrudes from the stepwise portion.

9. The overfill prevention valve of claim 8, wherein the curved valve head portion is configured to slidably move toward the second valve seat, such that a gap is defined between the second valve seat and the valve head portion when the valve head portion abuts on the second valve seat.

10. The overfill prevention valve of claim 9, wherein the front end opening is disposed in a center of a front end of the curved valve head portion to communicate with the second opening.

11. The overfill prevention valve of claim 10, wherein a plurality of ribs radially protrude from an outer circumference of the stepwise portion, and support one end of the first urging unit.

12. The overfill prevention valve of claim 11, wherein the valve cap includes:
   a cylindrical insertion portion inserted into an inner circumference of the valve body; and
   a lid portion provided to one end of the cylindrical insertion portion and fitted into the base end opening of the valve body.

13. An overfill prevention valve disposed in an evaporant line through which a fuel tank communicates with a canister, the overfill prevention valve including:
   a valve housing comprising:
      a first opening which communicates with the fuel tank;
      a second opening which communicates with the canister;
      a first valve seat provided in the first opening; and
      a second valve seat provided in the second opening;
   a parent valve which is disposed within the valve housing to move slidably with respect to the first valve seat and the second valve seat, the parent valve comprising:
      a base end opening communicating with the first opening;
      a front end opening communicating with the second opening; and
      a third valve seat provided in the base end opening;
   a first urging unit which urges the parent valve toward the first valve seat;
   a child valve which is disposed within the parent valve to move slidably with respect to the third valve seat;
   a second urging unit which is disposed within the parent valve and which urges the child valve toward the third valve seat; and
   an air passage forming unit which forms an air passage between the parent valve and the first valve seat when the parent valve abuts on the first valve seat,
   wherein an urging force of the first urging unit and an urging force of the second urging unit are configured such that:
      in a first state where an internal pressure of the fuel tank is lower than a first predetermined value, the parent valve abuts on the first valve seat due to the urging force of the first urging unit, and the child valve abuts on the third valve seat due to the urging force of the second urging unit;
      in a second state where the internal pressure of the fuel tank exceeds a second predetermined value which is higher than the first predetermined value, the parent valve slides against the urging force of the first urging unit and abuts on the second valve seat, and the child valve goes away from the third valve seat against the urging force of the second urging unit; and
      in a third state where the internal pressure of the fuel tank becomes lower than the second predetermined value but is still higher than the first predetermined value, a valve opening pressure of the child valve from the third valve seat is higher than a valve opening pressure of the parent valve from the second valve seat, so that the child valve abuts on the third valve seat due to the urging force of the second urging unit during when the parent valve is abutting on the second valve seat.

14. The overfill prevention valve of claim 13, wherein the parent valve includes:
   a valve body that comprises the front end opening communicating with the second opening; and
   a valve cap which is fitted into the valve body and comprises the base end opening communicating with the first opening.

15. The overfill prevention valve of claim 14, wherein a base end of the valve body is opened, and a stepwise portion of a reduced diameter is formed at a front side of the valve body.

16. The overfill prevention valve of claim 15, wherein a curved valve head portion protrudes from the stepwise portion.

17. The overfill prevention valve of claim 16, wherein the curved valve head portion is configured to slidably move toward the second valve seat, such that a gap is defined between the second valve seat and the valve head portion when the valve head portion abuts on the second valve seat.

18. The overfill prevention valve of claim 17, wherein the front end opening is disposed in a center of a front end of the valve head portion to communicate with the second opening.

19. The overfill prevention valve of claim 18, wherein a plurality of ribs radially protrude from an outer circumference of the stepwise portion at regular intervals, and support one end of the first urging unit, and
   wherein the valve cap includes:
      a cylindrical insertion portion inserted into an inner circumference of the valve body; and
      a lid portion provided to one end of the cylindrical insertion portion and fitted into the base end opening of the valve body.

* * * * *